(No Model.)

F. A. MANEGOLD.
HUB ATTACHING DEVICE.

No. 567,946. Patented Sept. 15, 1896.

Witnesses
Caleb J. Bieber
D. M. Stewart

Frederick A. Manegold
Inventor
By Attorney

UNITED STATES PATENT OFFICE.

FREDERICK A. MANEGOLD, OF READING, PENNSYLVANIA, ASSIGNOR OF ONE-HALF TO JONATHAN Z. ALBERT, OF SAME PLACE.

HUB-ATTACHING DEVICE.

SPECIFICATION forming part of Letters Patent No. 567,946, dated September 15, 1896.

Application filed January 27, 1896. Serial No. 576,938. (No model.)

*To all whom it may concern:*

Be it known that I, FREDERICK A. MANEGOLD, a citizen of the United States, residing at Reading, county of Berks, State of Pennsylvania, have invented certain Improvements in Hub and Axle Connections for Vehicles, of which the following is a specification.

My invention relates particularly to an improved means for securing vehicle-wheels upon their spindles, the main object being to enable a wheel of any ordinary hub construction and having any ordinary form of box to be retained upon its spindle independently of the exterior nut, which is commonly liable to work loose and permit the loss of the wheel, with more or less serious results. This object I attain in a very simple construction, which is easily and cheaply applicable to any ordinary vehicle, as stated.

The invention is fully described in connection with the accompanying drawings, and the novel features are pointed out in the subjoined claim.

Figure 1:
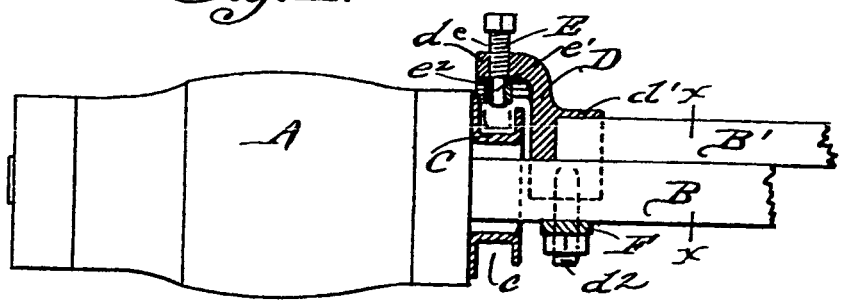
Figure 2:
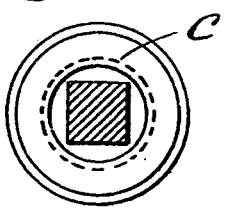
Figure 3:
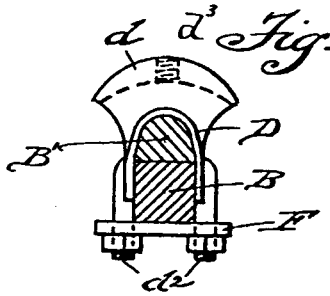

Figure 1 shows a portion of a vehicle-axle with a wheel-hub thereon and my hub and axle attachments applied thereto, the latter being shown in cross-section. Fig. 2 is a separate view of the grooved ring. Fig. 3 is a sectional view on the line $x\,x$ of Fig. 1.

A represents the hub of a wheel, B the metal, and B' the wooden bed of the axle, all of which are of usual construction.

C is a grooved ring of ordinary form adapted to loosely encircle the axle B and secured by means of screws or nails to the butt or face $a$ of the hub.

D is the axle attachment, which in the construction shown is arranged in the form of a clip for clamping the wooden bed B' to the metal axle B, the band portion $d'$, inclosing the squared end of the wood, being drawn down tightly thereupon in the ordinary manner by means of nuts on the screw-threaded ends or bolts $d^2$ and bearing against the clip-bar F. Forming a part of this clip attachment is a projection $d$, extending upward and outward therefrom, so as to overhang the grooved ring C. This overhanging projection $d$ carries a locking pin or screw E, which is preferably made with a screw-threaded body $e$, adjustably engaging a tapped hole $d^3$ in the overhanging projection $d$, and a reduced inner end $e'$, upon which is loosely secured a sleeve or roller $e^2$ of somewhat larger diameter than the screw-threaded portion $e$. When this locking-screw is moved outward until the sleeve $e^2$ comes in contact with the inner face of the overhanging projection, the hub A is left free to move outward upon its spindle or bearing; but when screwed in the sleeve $e^2$ enters the groove $c$ and prevents such movement of the hub while permitting it to turn freely, the sleeve $e$ being preferably arranged to serve as an antifriction-roller if brought in contact with the flanges of the ring. It will therefore be seen that the hub may be securely retained upon the axle independently of the end nut or may be quickly removed when desired. At the same time the locking-pin cannot be lost and causes practically no wear or friction, and the device requires no special construction either of hub, box, or axle, but is quickly applicable to any wagon or carriage by an ordinary workman.

What I claim is—

The combination with an axle and wheel hub of a separately-formed grooved ring fixed to the inner face of the hub and rotating therewith, an axle attachment having a projection thereon overhanging said grooved ring and a pin or screw in said overhanging projection having a sleeve or roller $e^2$ fixed to the inner end thereof and adapted to loosely enter the groove in the ring, said pin or screw being capable of a limited inward and outward movement in the overhanging projection sufficient to allow the sleeved end to be thrown into or out of engagement with the grooved ring substantially as and for the purpose set forth.

In testimony whereof I affix my signature in presence of two witnesses.

FREDK. A. MANEGOLD.

Witnesses:
 ADAM L. OTTERBEIN,
 H. CLINTON HELLER.